June 13, 1933.  E. S. PORTER  1,914,214
REPLACEABLE FILM MAGAZINE FOR MOTION PICTURE CAMERAS
Filed Jan. 15, 1931  3 Sheets-Sheet 1
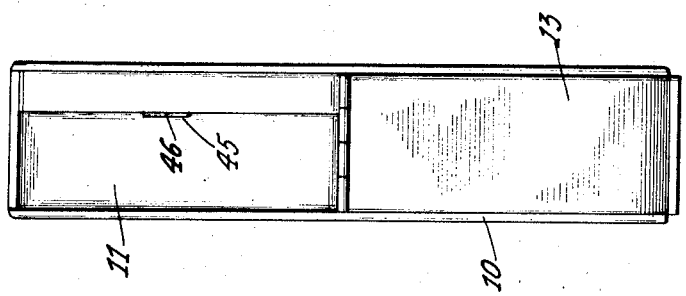
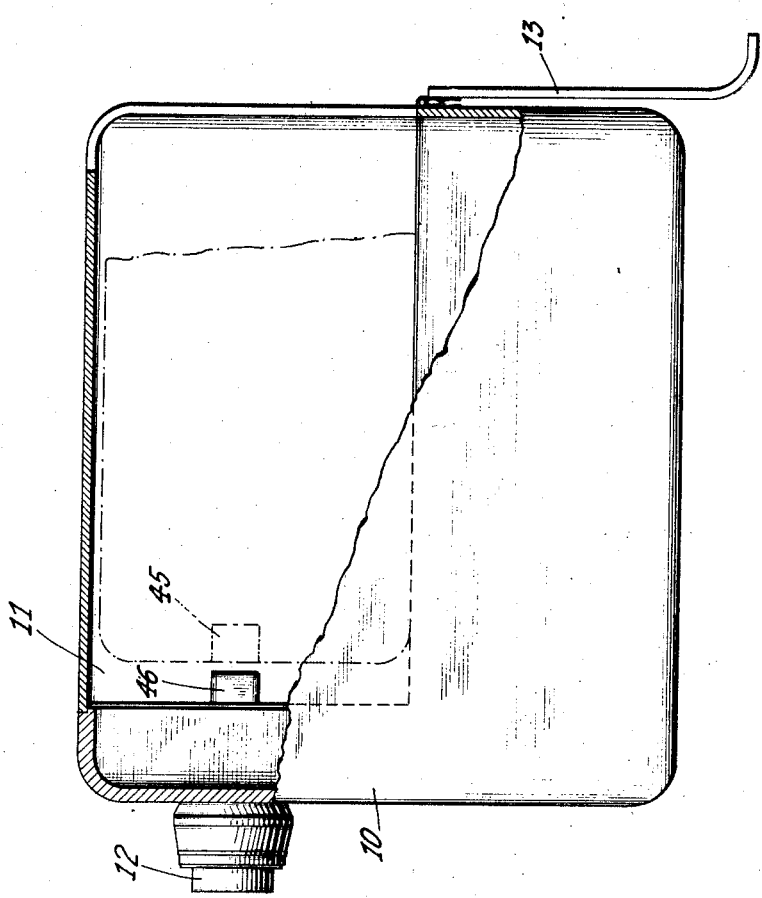
Inventor
Edwin Stanton Porter.
By his Attorneys June 13, 1933.  E. S. PORTER  1,914,214
REPLACEABLE FILM MAGAZINE FOR MOTION PICTURE CAMERAS
Filed Jan. 15, 1931  3 Sheets-Sheet 2
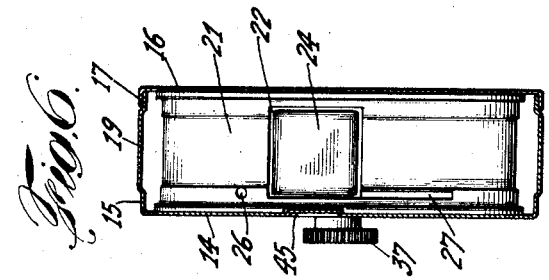
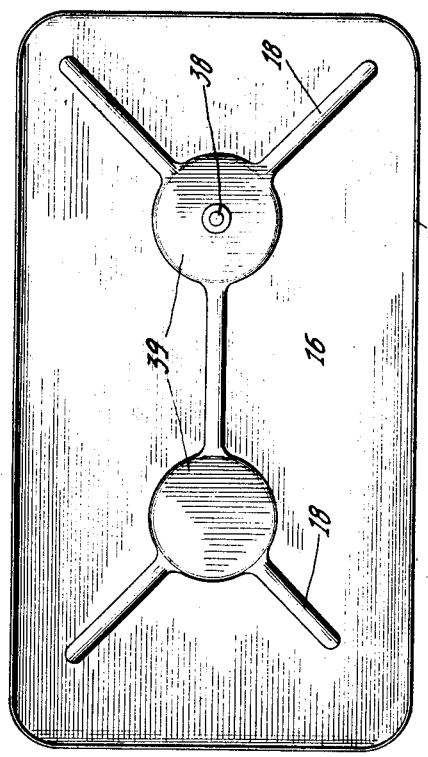
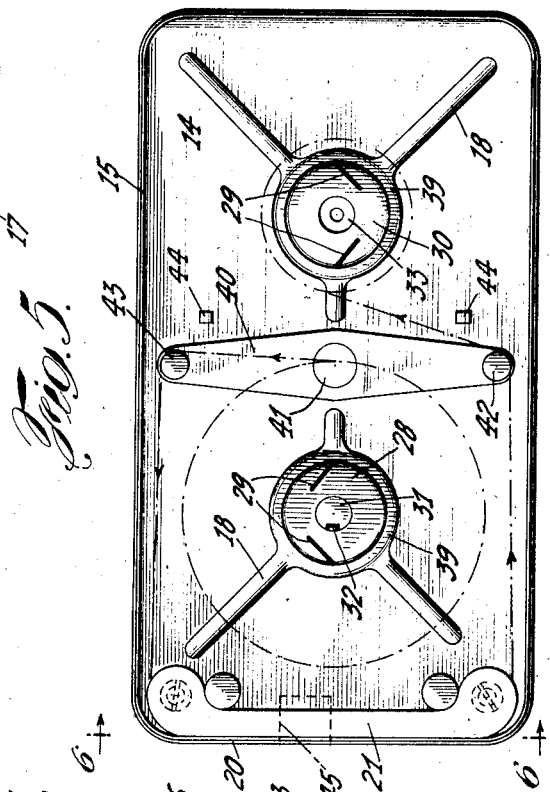
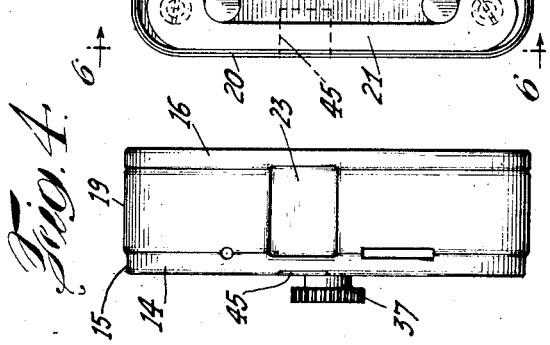
Inventor
Edwin Stanton Porter
By his Attorneys

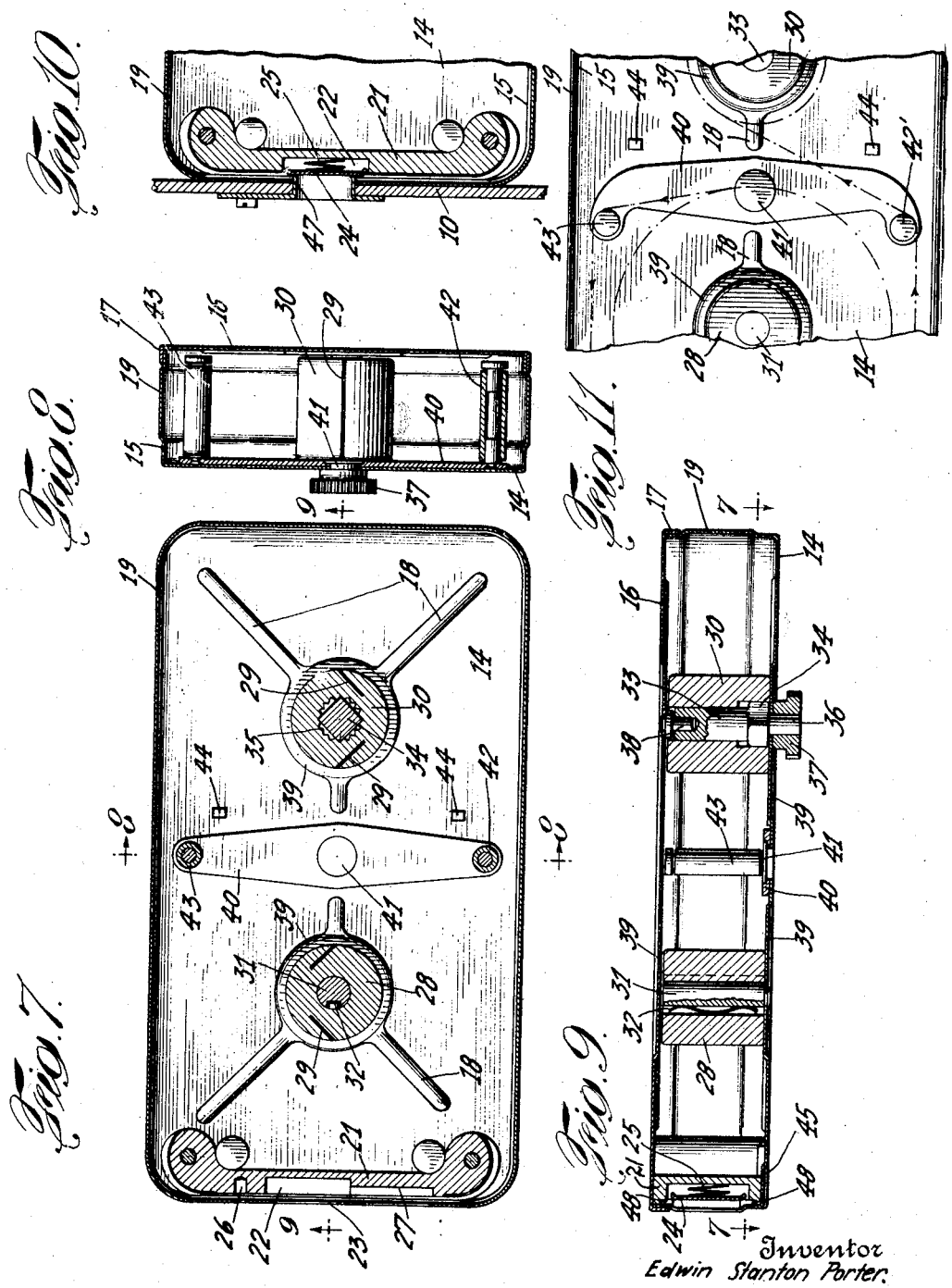

Patented June 13, 1933

1,914,214

UNITED STATES PATENT OFFICE

EDWIN STANTON PORTER, OF NEW YORK, N. Y.

REPLACEABLE FILM MAGAZINE FOR MOTION PICTURE CAMERAS

Application filed January 15, 1931. Serial No. 508,963.

The present invention relates to improvements in film magazines, and more particularly to a novel magazine capable of holding unexposed film in a mounted condition ready for use and capable of being charged into a camera and discharged therefrom as a unit, with especial reference to amateur motion picture cameras.

One of the main objects of this invention is to provide a new and novel magazine for holding a charge of film in position ready for exposure and to have such a loaded magazine capable of easy shipment and of easy carrying size.

A main object of the invention is to provide simple and efficient means whereby the film in the magazine, when the magazine is properly inserted in the camera, will be absolutely and accurately disposed in the proper plane at an accurately predetermined distance from the camera lens.

Another object of the invention is to provide means whereby an unauthorized magazine cannot be inserted in the camera into proper optical position for taking pictures.

A further object is to provide means whereby the film can be very quickly and easily threaded into the magazine without delay and without the employment of complicated construction.

A further object of the invention is to provide simple and efficient means whereby, when the film has been substantially entirely run off the supply reel, the mechanism is stopped without damaging either the mechanism or the film.

A still further object is to provide means whereby the picture portion of the film within the magazine is kept substantially entirely from rubbing contact with the walls of the magazine.

Yet a further object is to provide simple and efficient means whereby the edge of the film as it moves through the magazine rubs in contact with a minimum area of the magazine. This same construction of the magazine achieves a decided increase in strength of the walls of the magazine and provides exceptional rigidity.

A further object is to provide film spools in the magazine which can be readily removed therefrom to allow quick and easy threading of the film thereon before the film is inserted in the magazine.

A still further object is to provide means in the construction of the connection between the film spools and their supports whereby positive movement of the spools is determined and whereby over-running of the supply reel or spool is prevented.

A further object is to provide an improvement in the construction of film actuating mechanism so that the film feeding device employed is relieved of as much of the load and inertia of the film reels or supply spools as possible.

Further and more specific objects, features and advantages will more clearly appear from a consideration of the specification hereinafter taken in connection with the accompanying drawings which form part of the specification and will illustrate a present preferred form of the invention.

Briefly considered and in general terms, the invention is concerned with an improved magazine for a motion picture camera into which this unitary, complete magazine is insertable and from which the magazine is readily removable when the film has been exposed. Such loading may be done at any time of the day or night without affecting the film. The magazine is of a type that can be sold as a separate unit from the camera and the purchaser merely has to insert the magazine into the camera in order to make it ready for use. This novel magazine preferably is in the form of a rectangular casing relatively shallow in depth, with top, bottom and lateral walls, and containing a supply reel, a take-up reel, a cooperating rocker arm engaging the film and a stationary gate plate disposed adjacent one wall of the casing and between which and the gate plate, the film is adapted to pass as it is moved by the feeding mechanism of the camera to move it past the picture opening in the wall of the magazine.

A feature of the invention resides in the provision of cooperating mating elements formed on the magazine and formed within the camera, which are so relatively disposed that when a magazine as constructed herein, is inserted in the camera to its proper position, the film is in the exact desired plane with respect to the lens of the camera. If a magazine not provided with such mating elements is inserted within the camera the lack of this construction will prevent its film from being properly disposed focally, and therefore, detection of the improper magazine is rendered extremely simple. Preferably the mating elements include a projection on the camera adapted to register with a slot or recess in the adjacent face of the magazine.

A further feature of the invention is to provide a magazine casing which is made of light flexible, though strong material, preferably metal. Brass has been found to serve the purpose efficiently. One wall of this magazine is provided with a picture opening and adjacent this wall there is disposed a preferably rigid gate-plate. Normally the flexible wall of the casing is disposed so close to the adjacent face of the gate-plate that the film which passes therebetween is held with a reasonable amount of pressure. However, by flexing the walls of the magazine with the fingers, that wall adjacent the gate plate can be moved there-away sufficiently to permit ready threading of the film into position between the gate plate and the flexible wall. Release of the fingers will permit the threaded film to be properly gripped.

A further feature of the invention resides in a flexibly mounted shoe positioned in the gate plate. This shoe is preferably resiliently pressed forward against the film so as to move it toward the aperture opening in the magazine wall. When the magazine is assembled within the camera it engages a frame held by the camera. This frame is disposed within the magazine receiving recess in the camera, and has an opening therein of exactly the right size for the desired picture to be taken. The frame has a face projecting into the magazine recess. The plane of this face being in an exact predetermined position or distance with respect to the lens of the camera. This frame is adapted to cooperate with the aperture opening in the adjacent wall of the magazine when inserted to engage the film bearing on the flexible shoe. Flexibility of the shoe will, therefore, permit the film on the shoe to press against the accurately aligned face plane of the frame so that the film will be absolutely, accurately aligned with respect to the camera lens, even though the magazine as a whole may vary its position slightly within the camera. This permits reasonable variations in the manufacturing accuracy of the magazine without in any way impairing the certainty that the film will be absolutely and properly aligned.

In this type of magazine, the film is fed preferably by an intermittently operating claw mechanism, which claw mechanism pulls the film by a picture opening of the magazine. As the film is thus pulled that portion of it which is located between the claw mechanism and the take-up reel is instantly taken up by the constant turning movement of the take-up reel, whether that reel is positively and constantly driven from outside the magazine or is constantly actuated by a spring mechanism within the magazine. Between the take-up reel and the claw mechanism there is disposed a roller on one end of a rocker arm pivoted within the magazine so that as the take-up reel tends to take up the film after it has been fed by the claw mechanism there is a pull on this roller which tends to oscillate the rocker arm in a given direction.

The magazine also contains a supply reel from which the film extends over another roller on the opposite end of the same rocker arm. Thence the film extends between the flexible wall of the magazine and the gate where it is engaged by claw mechanism. Consequently, when the roller, first mentioned, is moved by action of the take-up reel the other roller is moved and in so moving pulls a small length of the film from the suply reel just in advance of the time when the claw mechanism is about to feed a corresponding portion of the film in front of the picture opening. Consequently a loop is formed in the film between the supply reel and the claw mechanism so that as the claw mechanism engages the film to feed it, it pulls on a free loose portion of the film which has been previously loosened and pulled out. This improved construction does not, therefore, have to bear the burden of moving the entire supply reel and overcome its inertia. This novel construction permits use of a much lighter feed mechanism and one which is capable of being operated at higher speeds than would otherwise be the case.

Preferably the rocker arm is pivoted and movable with respect to stop pins in the casing to limit its movement in either direction. The rocker arm is also so shaped that the rollers thereon are positioned with respect to the film so that the film moves around these rollers at a diverted wide angle whereby the tendency to crack or injure the film is reduced as low as possible. This provision of the single rocker arm with the film engaging rollers on its opposite ends is a simple efficient means for providing a loop in the film especially between the supply reel and the claw mechanism. This loop forming mechanism is thus automatically operated by mechanism associated with the take-up mechanism of the film. It is instantly apparent that such a mechanism takes a great load off of the feed device which can, therefore, be run at a much higher speed and can be made of much lighter material and much smaller, two features which are very desirable in the smaller sized cameras such as small amateur moving picture cameras.

The supply reel is mounted on a spool and loosely rotates on a stub shaft within the magazine. Preferably, spring means is disposed on the stub shaft and engaging the inner periphery of the spool to afford resistance to the end of the film so that over-running of the supply reel is prevented. The inner end of the film on the supply reel is bent and extends into a slot in the spool. The position of this slot is such that when the film has been substantially entirely run off of the supply reel any further tendency of the claw mechanism to operate on the film is resisted by reason of the fact that the film is wedged or bent into this slot. This resistance together with the resistance or smoothing action on the film around the rollers on the rocker arm will be sufficient to stop the feed mechanism, so that as soon as this condition of the film is reached, no further movement of the film occurs. Therefore, the end of the film never leaves the supply reel and consequently can not be drawn by the picture opening and be rapidly flipped around on the take-up reel, under action of the driving spring or other means, which would be the case if this end of the film were released from the hub of the supply reel or spool.

A further feature of the invention is to provide walls in the magazine with off-set portions at those areas which would otherwise rub against the picture section of the film. These off-set portions together with the picture sections tend to strengthen the walls of the magazine.

The present preferred form of the invention is shown in the drawings of which:

Fig. 1 is a side elevation partly in section of an amateur motion picture camera employing the magazine of this invention, showing the magazine in dotted-and-dash lines partly inserted within the camera;

Fig. 2 is an end elevation of Fig. 1;

Fig. 3 is an inverted plan view of the cover portion of the magazine;

Fig. 4 is a front elevation of the magazine;

Fig. 5 is a plan view of the body portion of the magazine;

Fig. 6 is a section taken on the line 6—6 of Fig. 5;

Fig. 7 is a horizontal section taken on the line 7—7 of Fig. 9;

Fig. 8 is a vertical section of the line 8—8 of Fig. 7;

Fig. 9 is a vertical section taken on the line 9—9 of Fig. 7;

Fig. 10 is a detail partial section enlarged of the parts in their engagement with the front end of the magazine in engagement with the adjacent face of the magazine receiving recess in the camera; and Fig. 11 is a partial plan view of a modified form of rocker arm.

In the present preferred form a magazine is adapted to be used preferably in connection with amateur motion picture cameras. A preferred form of camera of this type is shown generally in Figs. 1 and 2 and comprises a casing 10 having a magazine receiving recess 11 in line with which a lens 12 is disposed. The casing is preferably inserted into the recess from the rear of the camera by opening a door 13 and the front end of the magazine is movable until it abuts the inner end of the camera recess 11.

In this position the feed mechanism of the camera in general is properly engaged with the film within the magazine so that the film can be intermittently moved in any desired manner to take motion pictures.

The magazine itself preferably comprises separable sections such as a body portion and a top portion, the body portion shown in Fig. 5 has a bottom wall 14 and preferably substantially continuous side wall 15, preferably made of flexible light weight material such as grass. The top portion comprises a cover having a top wall 16 and a very thin continuous lateral wall 17 which fits snugly over the top edge of the lateral wall 15 on the body portion. Both the top and the body portions on their top and bottom walls are provided with inwardly projecting ribs or corrugations 18 to strengthen these surfaces and at the same time provide minimum areas in contact with the edge of the film disposed within the magazine so that a minimum wear and tear on the edges of the film results. The lateral wall 15 on the body portion preferably is off-set throughout, as shown at 19, so that the picture sections of the film which move along certain portions of this lateral wall will not come in contact with the wall of the magazine and be scratched or unduly rubbed.

Adjacent the end wall 20 of the magazine there is disposed therein a fixed gate plate 21 preferably of rigid material. This gate plate has a depression or recess 22 therein adjacent an aperture opening 23 in the wall 20. In the recess 22 there is disposed a pressure shoe 24 backed by a spring 25 which tends to press the shoe forward against the aperture opening 23. The pressure shoe, as shown, is larger than the opening 23 and will bear thereagainst but cannot be pushed therethrough. The gate plate 21 is also provided with a small bore 26 to receive pin, and slot 27 to receive and permit the movement of the film feeding device.

The film is adapted to be passed between the gate plate 21 and the wall 20. The wall 20, preferably, is made of light weight flexible material and normally lies sufficiently close to the adjacent face of the gate plate 21 as to bear slightly on the film. Within the magazine the film is wound on a supply reel or spool 28, preferably the end of the film is bent on an angle to the main portion and inserted in one of several non-radial slots, such as 29 formed in the periphery of the spool 28. From this spool it passes over the top curved edge of the gate plate and then down between the gate plate and the slot 20 by the aperture 23. The film then passes to the take-up reel or spool 30 which is also provided with several of the above mentioned non-radial slots 29. The spool 28 has a central bore to receive a stub shaft 31 mounted on the bottom wall of the magazine, said stub shaft has a slot in its face in which a spring 32 lies. This spring projects slightly from the slot and is adapted to bear with predetermined pressure against the face of the bore in the spool 28 to resist the turning movement of the spool and, therefore, resist the unwinding of the film therefrom and prevent overrunning of the supply spool.

The take-up spool is likewise mounted on a stub shaft 33 which is received in a bore in the spool. This stub shaft has a squared portion 34 on its lower portion within the magazine. This squared portion is adapted to be received in the lower end of the spool bore, which lower end is serrated, as shown at 35, so that the spool can be slipped into the stub shaft at almost any angular position and make positive direct contact with the stub shaft. The stub shaft 33 has an integral pin extension 36 passing through the bottom of the magazine and fastened thereon. The magazine is also provided with a driving gear 37. The upper end of the stub shaft has a small bore which receives a pin 38 fastened to the top or cover of the magazine. The portions of the top and bottom of the magazine adjacent the respective top and bottom of the spools are depressed as indicated by the numeral 39 so that these depressions lie closely adjacent the ends of the spools which act as buffers to prevent the top and bottom walls of the casing from being pinched inwardly too far and thereby avoid pinching of the film.

Disposed between the supply and take-up spools within the casing is a rocker arm 40 pivoted at 41. On the ends of the rocker arm are disposed pins or rollers 42 and 43. Stop elements 44 adjacent opposite ends of the rocker arm 40 limit its pivotal movement in either direction. The film passes from the spool 28 over and around the roller 43, then to the top of the gate-plate 21 down between it and the wall 20, by the aperture opening 23, then around the lower end of the gate-plate, around the roller 42 and thence to the take-up spool 30. The take-up spool through the gear 37 is positively driven after the magazine is inserted within the camera. Mechanism not shown being automatically engaged with said gear upon insertion of the magazine in the recess 11. The film thus throughout, is pressed against the aperture opening 23 by shoe 24. The film can be threaded readily by reason of the fact that the fingers can pinch the side wall of the magazine and flex the wall 20 outwardly away from the gate-plate. The spools 28 and 30 can be readily slipped off their stub shafts so that the film can be fixed to the rollers and rolled thereon while removed from the magazine to facilitate the operation and then can be quickly and easily slipped into the stub shafts with which they become instantly and properly engaged.

Referring to Figs. 1 and 4 it will be seen that a depression 45 is disposed to begin in one wall of the magazine and extends along the adjacent wall. In these figures it will be seen that specifically the depression 45 begins in the front wall, on which front wall the aperture opening 23 is disposed and extends along the bottom wall 14. When the magazine is inserted into the camera recess 11, this depression 45 is adapted to be aligned with a similarly shaped projection 46 formed within the camera recess 11. By reason of this registration, the magazine can be moved to full, complete insertable position within the recess. If the magazine did not have this depression it could not be fully inserted and the film could not be brought into the proper optical plane.

When the film is in the proper optical position a flange frame indicated by the numeral 47, in Fig. 10, mounted in the bottom or end wall of the camera recess 11 projects as shown in Fig. 10 through the aperture opening 23 and bears against the pressure shoe of the film. The front faces of this flanged frame are in a plane exactly and accurately determined with respect to the camera lens, not shown. By pressing against the pressure shoe, the shoe and the film are moved back slightly even though the magazine position may vary or be moved somewhat. Thereby the film when the magazine is inserted is always disposed in a single accurate predetermined plane. This permits slight inaccuracies in the construction and assembly of the magazine without effecting the optical accuracy as far as the film position is concerned.

As the feeding mechanism pulls the film down past the aperture opening 23, the positively driven take-up reel 30 will tend to take up this free portion of the film. Due to the action of the take-up spool it will cause movement of the roller 42 to the left. This will cause movement of the roller 43 to the right. This right-hand movement of the roller 43 will tend to pull some of the film on the supply spool 28 thus causing the formation of a small loop in the film between the supply spool and the gate plate where the feeding mechanism is located. Consequently, by reason of the fact that a loop in the film has already been formed the film can be freely moved by the feeding mechanism without having to move the entire body of film. As shown in Fig. 11, the rollers 42' and 43' are located on the arm 40 the ends of which are somewhat curved. This prevents the film from passing around the rollers at too sharp an angle and thus avoids splitting or cracking of the film and eliminates undue structural strain. Referring to Fig. 9 it will be seen that the front face of the gate plate 21 is provided with a recess indicated by the numeral 48 forming a shoulder on opposite sides thereof on which the edge portions of the film rest. Since the wall 20 lies closely adjacent the face of the gate-plate it will be perceived that the edge portions of the film are securely housed between the gate-plate and the wall so that it is impossible for anyone to grasp the film and pull it out of the magazine.

It will, therefore, be seen from a consideration of this invention that a simple, efficient, compact, lightweight, unitary magazine has been provided with the film presented in position in an aperture opening by a flexible element so that when the magazine is inserted in the camera recess it may be properly aligned with the projection in said recess. The film will be resiliently pressed against the frame regardless of slight variations in the position and manufacture of the magazine as a whole. The definite positioning of the frame with respect to the camera lens, therefore, insures that the film will also be in the proper optical plane for accurate photography. The magazine walls are constructed to eliminate binding or rubbing of the film, they are strengthened to make them rigid and to present a minimum area rubbing against the edge of the film. The film spools are readily removable in the magazine for expansion thereof of the film thereon and can be instantly replaced with the film thereon. The flexibility of the wall of the magazine adjacent the gate plate permits quick and easy threading of the film therethrough. A pivoted rocker arm permits automatic and accurate formation of loops in the film so that light-weight, quick-acting, feeding mechanism can move the film without being subjected to too much of a burden due to the weight of the film and the inertia of the spool. The film in its passage through the magazine is not subjected to too great a change in direction. The take-up spool is positively driven and can be quickly associated with the drive without having to be disposed thereon in any predetermined position. The supply spool is, by simple means prevented for over-winding while at the same time being capable of being quickly and readily insertable on its stub shaft.

While the invention has been described in detail and with respect to a present preferred form thereof it is not to be limited to such details and forms since many changes and modifications may be made in the invention without departing from the spirit and scope of the invention in its broadest aspects. Hence it is desired to cover any and all forms and modifications of the invention which may come within the language or scope of any one or more of the appended claims.

What is claimed, is:

1. A magazine for a motion picture camera comprising a body portion and a top portion, certain walls of said magazine being off-set to prevent scratching of the picture portion of the film during its travel, means for receiving a roll of film, a second means for receiving a reel upon which the film is to be wound after exposure, means for driving said second means, a film gate-plate positioned adjacent one of the walls of said magazine to form therewith a channel for the film to pass to be exposed, said wall having an aperture therein to allow exposure of said film, a roller positioned to have film pass therearound in moving from the supply reel to said gate, and another roller positioned for the film to pass therearound after being exposed and on the way to said take-up reel, a pivotal arm within the magazine on which said rollers are disposed thereby permitting the film to be pulled by the pivotal action of said arm.

2. A magazine for a motion picture camera comprising a body portion and a top portion, certain walls of said magazine being off-set to prevent scratching of the picture portion of the film during its travel, means for receiving a roll of film, a second means for receiving a reel upon which the film is to be wound after exposure, means for driving said second means, a film gate-plate positioned adjacent one of the walls of said magazine to form therewith a channel for the film to pass to be exposed, said wall having an aperture therein to allow the exposure of said film, said magazine having a depression therein to receive a projection mounted in the camera thereby allowing the magazine to be assembled in said camera in picture taking position, said depression beginning in one wall of the magazine and extending along an adjacent wall.

3. A magazine for a motion picture camera comprising a body portion and a top portion, means for receiving a roll of film, a second means for receiving a reel upon which the film is to be wound after exposure, means for driving said second means, a film gate-plate positioned adjacent one of the walls of said magazine to form therewith a channel for the film to pass to be exposed, said wall having an aperture therein to allow the exposure of said film, said magazine having a depression therein to receive a projection mounted in the camera thereby allowing the magazine to be assembled in said camera in picture taking position, said depression beginning in the wall of the magazine in which the aperture opening is located and extending therefrom along an adjacent wall of the magazine.

4. A magazine for a motion picture camera comprising a body portion, and a top portion, means for receiving a roll of film, a second means for receiving a reel upon which the film is to be wound after exposure, means for driving said second means, a film gate-plate positioned adjacent one of the walls of said magazine to form therewith a channel for the film to pass to be exposed, said wall having an aperture therein to allow exposure of said film, a movably mounted pressure shoe disposed on the outer face of the gate-plate adjacent the aperture in the wall of the magazine and adapted to press the film towards said aperture, said film and pressure shoe adapted to be engaged by a picture defining frame disposed in and projecting from a wall of the camera recess into which the magazine is inserted whereby the film will be disposed in a predetermined plane.

5. A magazine for a motion picture camera comprising separable sections, means for receiving a roll of film, a second means for receiving a reel upon which the film is to be wound after exposure, means for driving said second means, a film gate-plate positioned adjacent one of the walls of said magazine to form therewith a channel for the film to pass to be exposed, said wall having an aperture therein to allow exposure of said film, a movably mounted pressure shoe disposed on the outer face of the gate-plate adjacent an aperture in the wall of the magazines and adapted to press the film towards said aperture, said film and pressure shoe adapted to be engaged by a picture defining frame disposed in and projecting from a wall of the camera recess into which the magazine is inserted whereby the film will be disposed in a predetermined plane, the outline of the opening in said frame being exactly defined in accordance with the size of the desired picture section to be taken, said frame adapted to project through the aperture opening in the wall of the magazine to bear against the film.

6. A magazine for a motion picture camera comprising separable sections, means for receiving a roll of film, a second means for receiving a reel upon which the film is to be wound after exposure, means for driving said second means, a film-gate-plate positioned adjacent one of the walls of said magazine to form therewith a channel for the film to pass to be exposed, said wall having an aperture therein to allow exposure of said film, a movably mounted pressure shoe disposed in the outer face of the gate-plate adjacent the aperture in the wall of the magazine and adapted to press the film towards said aperture, said film and pressure shoe adapted to be engaged by a picture defining frame disposed in and projecting from a wall of the camera recess into which the magazine is inserted whereby the film will be disposed in a predetermined plane, said magazine having a depression therein to receive a projection mounted in the camera whereby the magazine can be assembled in the camera in full picture taking position.

7. A magazine for a motion picture camera comprising a body portion and a top portion, means for receiving a roll of film, a second means for receiving a reel upon which the film is to be wound after exposure, means for driving said second means, a film gate-plate positioned adjacent one of the walls of said magazine to form therewith a channel for the film to pass to be exposed, said wall having an aperture therein to allow exposure of said film, the wall of the magazine containing an aperture opening also having therein an opening to receive the film driving means, a resiliently mounted pressure shoe on the gate-plate adapted to press the film toward the aperture opening in the adjacent wall of the magazine, said film and pressure shoe adapted to be engaged by a projecting frame disposed on the adjacent wall of the camera recess when the magazine is inserted therein, the plane of the outer face of said frame being predetermined with respect to the camera lens and projecting into the aperture opening and the adjacent face of the magazine to bear against the film and thus accurately position it regardless of slight inequalities in the assembly and manufacture of the magazine which may cause slight variations of position of the magazine within the recess when inserted.

8. A magazine for a motion picture camera comprising a body portion and a top portion, means for holding the supply reel therein, means for holding the take-up reel and for driving the latter, a gate-plate adjacent one wall of said magazine, said wall having an aperture opening therein, means on the gate plate to press the film toward the aperture opening, the walls of the magazine along which the film passes being off-set to prevent contact of the walls with the picture section of the film, said film adapted to be engaged, when the magazine is inserted into the camera recess, by a projecting frame within said recess of definite size, and adapted to project into the aperture opening and bear against the film.

9. A magazine for a motion picture camera comprising a body portion and a top portion, means for holding the supply reel therein, means for holding the take-up reel and for driving the latter, a gate-plate adjacent one wall of said magazine, said wall having an aperture opening therein, means on the gate-plate to press the film toward the aperture opening, the walls of the magazine along which the film passes being off-set to prevent contact of the walls with the picture section of the film, said film adapted to be engaged, when the magazine is inserted into the camera recess, by a projecting frame within said recess of definite size, and adapted to project into the aperture opening and bear against the film, said magazine having a depression therein to receive a projection mounted in the camera to allow the magazine to be properly and fully assembled in the camera in picture taking position, said depression beginning in the wall of the magazine in which the aperture opening is located and extending along the adjacent wall.

10. A replaceable film magazine for motion picture cameras which comprises a casing of light weight material, one wall of said magazine having a picture opening therein, said wall being of flexible material, a fixed gate-plate within the magazine adjacent said wall, the normal position of the flexible wall with respect to the plate being such as to exert predetermined pressure on a film disposed therebetween, said wall being capable of being flexed away from the plate to permit threading of the film.

11. A replaceable magazine for motion picture cameras which comprises a shallow casing, a take-up reel and a supply reel disposed therein, a pivoted rocker arm disposed between said reels, film engaging elements on the opposite ends of said arm, a film passing over one of said elements on its passage from the supply reel to the picture opening in the magazine and passing over the other element in its passage from the picture opening to the take-up reel.

12. A replaceable magazine for motion picture cameras which comprises a shallow casing, a take-up reel and a supply reel disposed therein, a pivoted rocker arm disposed between said reel, film engaging elements on the opposite ends of said arm, means for limiting the movement of said arm in either direction, a film passing over one of said elements on its passage from the supply reel to a picture opening in the magazine and passing over the other element in its passage from the picture opening to the take-up reel, said elements on the end of said arms so disposed with respect to the line of travel of the film as to permit its direction of movement to be diverted a minimum amount.

13. A replaceable film magazine for motion picture cameras which comprises a shallow casing having a supply reel and a take-up reel therein, a picture opening in one face thereof in front of which the film is moved by means of feed mechanism, said take-up reel being actuated constantly to take up the film after it has passed said opening by the feeding mechanism and means engaging the film and disposed between said reels automatically actuated by the function of the take-up reel to pull a portion of the film off the supply reel to form a loop between the supply reel and the feeding mechanism whereby the burden of moving the supply reel and overcoming its inertia is taken off the feeding mechanism.

14. A replaceable film magazine for motion picture cameras which comprises a shallow casing in one wall of which is disposed a picture opening, a supply reel and a take-up reel therein, a pivoted rocker arm between said reels, film engaging elements on opposite ends of said rocker arm, one of said elements adapted to receive a film passing thereover from a supply reel to the feed mechanism, the other said element adapted to receive a film passing thereover from the feeding mechanism to the take-up reel, said take-up reel adapted to be actuated by a constant applied force to instantly take up film as it is moved by said feeding mechanism, the actuating of the take-up reel tending to move one element of said arm whereby the other element of said arm is moved to pull a small portion of the film of the supply reel to produce a loop of the film between the supply reel and the feeding mechanism.

15. A replaceable film magazine for motion picture cameras which comprises a shallow casing having top, bottom and lateral walls, said lateral walls throughout having off-set portions in line with the picture portions of the film to prevent the rubbing of these portions of the film against the wall.

In testimony whereof I have hereunto set my hand.

EDWIN STANTON PORTER.